United States Patent [19]

Troncoso

[11] Patent Number: 4,956,930
[45] Date of Patent: Sep. 18, 1990

[54] VEHICLE LICENSE PLATE COVER

[76] Inventor: Vincent F. Troncoso, 14090- 6100 Rd., Montrose, Colo. 81401

[21] Appl. No.: 336,684

[22] Filed: Apr. 12, 1989

[51] Int. Cl.$^5$ .............................................. G09F 7/00
[52] U.S. Cl. ...................................... 40/209; 40/200
[58] Field of Search ................ 40/453, 463, 492, 200, 40/204, 209, 508, 588, 591; 362/125, 321, 325, 354, 279, 290

[56] References Cited

U.S. PATENT DOCUMENTS

| | | | |
|---|---|---|---|
| 2,123,361 | 7/1935 | Hollis | 362/125 |
| 2,499,747 | 11/1948 | Griffith | 40/209 |
| 2,807,899 | 10/1957 | Adams | 40/204 |
| 2,847,783 | 8/1958 | Anderson | 40/453 |
| 3,135,063 | 6/1964 | Ricks | 40/453 X |
| 3,514,883 | 6/1970 | Albright | 40/492 |

*Primary Examiner*—Kenneth J. Dorner
*Assistant Examiner*—J. Bonifanti
*Attorney, Agent, or Firm*—Donald E. Nist

[57] ABSTRACT

The license plate cover prevents viewing of the license plate identifying numbers and symbols from the sides of the plate, but does not prevent viewing thereof from directly in line with the plate. The cover includes a frame adapted to overlie the plate and defining a central opening through which the plate numbers can be seen. To the frame are connected a number of spaced vanes which project outwardly thereof and obscure side viewing of the plate numbers. For this purpose, it is preferred to have the vanes parallel with each other and running from the top to the bottom of the frame across the opening, and perpendicular to the main plane of the frame. The vanes can be opaque or transparent. In the latter case, the collective effect of side viewing through the array of vanes is to obscure such viewing. The vanes can be unitary and integral with the frame or pivotally connected thereto for moving between an open position and closed position, the latter overlying the plate identification indicia, to protect the plate under special circumstances. The cover can include a slide bar to move the vanes, retainers to hold the vanes in open and closed positions and one or more spring-biased clips or the like to releasably connect the cover over the license plate. The sides of the vanes can bear symbols and the like for decorative and other purposes.

12 Claims, 1 Drawing Sheet

VEHICLE LICENSE PLATE COVER

BACKGROUND OF THE INVENTION

1. Field of the Invention

The present invention generally relates to protective devices and more particularly to an improved vehicle license plate cover.

2. Prior Art

Vehicle license plates are usually releasably secured to the back and/or front of a vehicle by attachment to a bracket attached to the front bumper or trunk or rear body shell. Occasionally, the license plate is sandwiched between a frame and the bracket. The frame may carry advertising at its perimeter, but otherwise serves no function except to help attach the license plate to the vehicle. According to prevailing motor vehicle codes, the numbers and symbols on the license plate must be clearly visible when the rear plate is viewed from behind it and the front plate is viewed from in front of it. This is to permit quick identification of the vehicle.

Rapid identification of a vehicle may, however, be undesireable, especially under circumstances where surveillance is being carried out by a private or public investigator of civil or criminal activities. It would be desireable under such circumstances to prevent viewing of the license plate from the side, as from a sidewalk, cross-street, house or other building, etc. Blocking of the side view of the license plate should be done in a manner which still conforms to the vehicle codes.

There are also unusual circumstances when the entire vehicle license plate could desireably be covered and fully protected against damage, for example, in the case of a severe sand storm, when traveling through heavy brush or over rocky, pebble-strewn roads and the like, or in a high wind filled with flying debris.

At present there is no vehicle license plate cover which can prevent viewing of the license plate numbers from the side while permitting full viewing thereof from the front and rear, and which also desireably shields the license plate from damage by sand, rocks and flying debris. There is a need for such a cover. Such cover should be simple in construction, inexpensive, durable and efficient. It preferably should be easy to attach and detach. Moreover, it would be desirable if the cover were capable of providing surfaces for carrying indicia which are decorative, informative, etc.

SUMMARY OF THE PRESENT INVENTION

The present invention satisfies all the foregoing needs. The invention is directed to an improved vehicle license plate cover. The cover is substantially as set forth in the Abstract of the Disclosure.

Thus, the cover fits over the face of the vehicle license plate and is attached directly to the plate or to a bracket holding the plate. The cover includes a frame which directly overlies the outer periphery, margin or perimeter of the license plate and thus is of the same overall size and shape, and which defines with its top, bottom and sides a central opening through which the numbers and other inidica of the plate can be viewed. An important second component of the cover comprises a plurality of flat vanes separately or integrally connected to the frame and spanning the central opening at spaced intervals. In a preferred embodiment, the vanes are parallel to each other and vertically bridge the central opening, including the sides thereof. The vanes project outwardly from the frame at an angle to the main plane of the frame. Preferably, the vanes are perpendicular thereto.

In another embodiment, the vanes are pivotally connected to the frame and therefore moveable between an open position perpendicular to the frame and a closed position parallel to the frame and wholly overlying the face of the license plate. A slide bar is connected to the vanes for moving them simultaneously between the open and closed positions, where they are releasably held by retainers on the frame. The vanes can be transparent or opaque. If transparent, there are a sufficient number of the vanes so that viewing of the license plate numbers from the side of the plate is nevertheless obscured by the cumulative obscuring effect of the vanes, since the vanes are provided with inclusions or surface irregularities or the like.

The vanes can also be provided with decorative, informative or amusing indicia or the like, if desired, which can be viewed from the side when the vanes are open or from the front or rear when the vanes are closed. Further features of the invention are set forth in the following detailed description and accompanying drawings.

DRAWINGS

DETAILED DESCRIPTION

Figure 1:
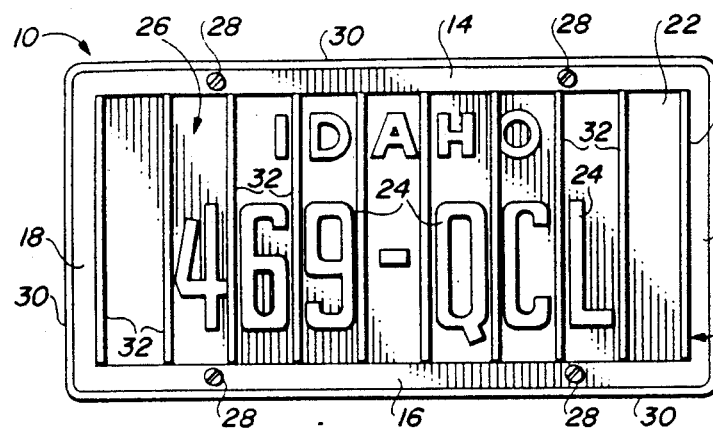
FIG. 1 is a schematic front elevation of a first preferred embodiment of the improved vehicle license plate cover of the present invention, shown in place over a license plate and attached to a rear bracket.
Figure 2:
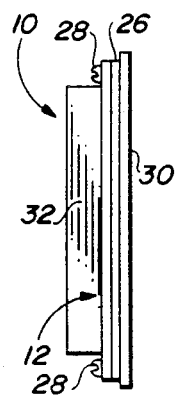
FIG. 2 is a schematic side elevation of the cover, plate and bracket of FIG. 1.

FIGS. 1 and 2

Now referring more particularly to FIGS. 1 and 2 of the drawings, a first preferred embodiment of the improved vehicle license plate cover of the present invention is schematically depicted therein. Thus, cover 10 is shown, which comprises a rectangular frame 12 formed of a top 14, bottom 16 and sides 18 and 20 integrally joined to define a central opening 22 through which the numerals and letters forming the identification indicia of a vehicle license plate, said indicia being designated with the numeral 24 in FIG. 1, can be seen. License plate is designated with the numeral 26 in FIG. 1 and is positioned directly behind frame 12. Frame 12 is releasably connected to plate 26 by screws 28 which pass back through frame 12 and plate 26 into a rear support bracket 30 which can be releasably fixed to a vehicle bumper, trunk, body shell (not shown).

Cover 10 further includes a plurality of flat vanes 32 which are thin and are integral with frame 12. Vanes 32 are parallel to each other Vanes 32 extend from the inner margin of top 14 down vertically to the inner margin of bottom 16, bridging central opening 22, including its side margins. Thus, in FIG. 1 a total of ten parallel vertical vanes are shown, two of which are at the side margins of opening 22. Frame 12 and vanes 32 can be formed of any suitable durable rigid material such as metal, plastic, wood, ceramic, hardened rubber, etc. Vanes 32 in FIG. 1 and 2 are opaque, effectively blocking a view of indicia 24 from the side, since vanes 32 project forwardly from frame 12 at right angles thereto. Since vanes 32 are thin, they do not obscure numerals 24 when viewed from a position directly in front thereof.

Thus cover 10 effectively prevents viewing of plate 26 from the side and therefore is of value in surveillance operations using a vehicle to which cover 10 and plate 26 are attached. Vanes 32 also have the effect of prevent the impingement of stones, sand, flying debris and the like against plate 26 and thus protect it from damage and becoming dirty. Cover 10 is simple, inexpensive, durable and efficient and complies with vehicle codes. It also helps to rigidify plate 26 against bending when bumped. Cover 10 can be made in a simple stamping or other forming operation of conventional materials.

FIG. 3

Figure 3:
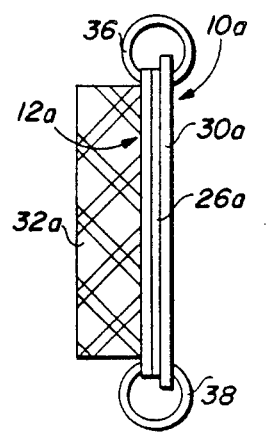
FIG. 3 is a schematic side elevation of a second preferred embodiment of the improved vehicle license plate cover of the present invention, shown in place over a license plate and connected to a rear bracket by a spring clip at the top and bottom thereof.

A second preferred embodiment of the improved cover of the present invention is schematically depicted in FIG. 3. Thus, cover 10a is shown. Components thereof similar to those of FIGS. 1 and 2 bear the same numerals but are succeeded by the letter "a". Cover 10a is substantially identical to cover 10, except that vanes 32a are higher than vanes 32 and bear a decorative pattern. Moreover, screws 28 are absent. Instead, cover 10a is connected to plate 26a and rear bracket 30a by a pair of spring clips 36 and 38. Cover 10a has substantially the other advantages of cover 10.

Figure 4:
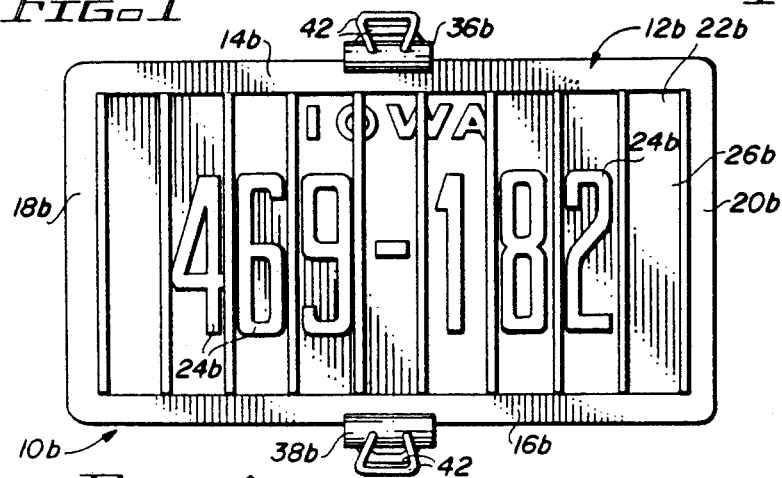
FIG. 4 is a schematic front elevation of a third preferred embodiment of the improved cover of the present invention, shown in place over a license plate.
Figure 5:
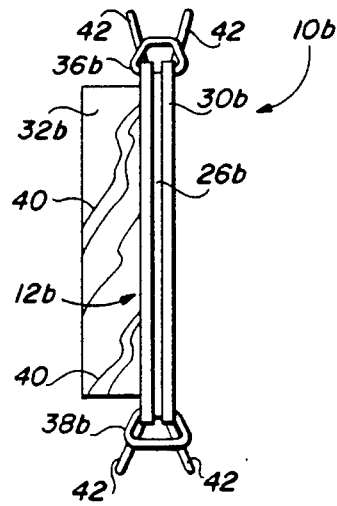
FIG. 5 is a schematic side elevation of the cover of FIG. 4.

FIGS. 4 and 5

A third preferred embodiment of the improved license plate cover of the present invention is schematically depicted in FIGS. 4 and 5. Thus, cover 10b is shown. Components thereof similar to those of cover 10 or 10a bear the same numerals but are succeeded by the letter "b". Cover 10b is substantially identical to cover 10a except that vanes 32b are transparent instead of opaque and of a different heighth. Vanes 32b collectively block a side view of numerals 24b of plate 26b because of the streaks of inclusions 40 in vanes 32b. Moreover, clips 36b and 38b are of spring steel but of different configuration than clips 36 and 38, clips 36b and 38b having biasing handles 42. Cover 10b has substantially the advantages of cover 10a, being easy to clip to and remove from plate 26b and bracket 30b.

FIGS. 6-9

Figure 6:
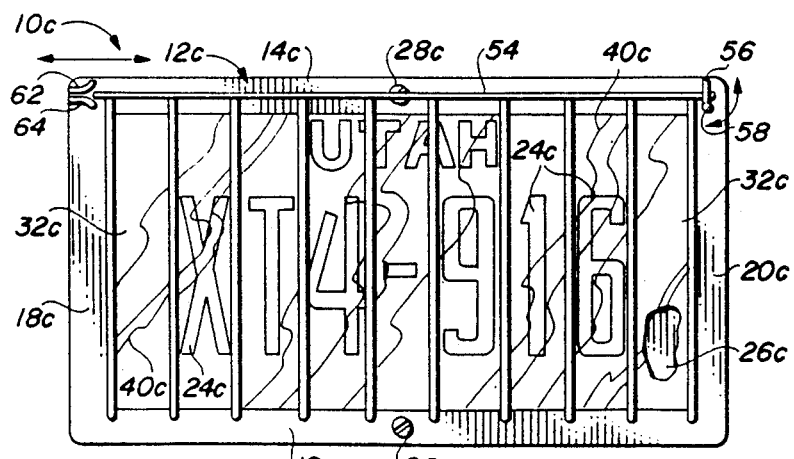
FIG. 6 is a schematic front elevation of a fourth preferred embodiment of the cover of the present invention, shown in place over a license plate.
Figure 7:
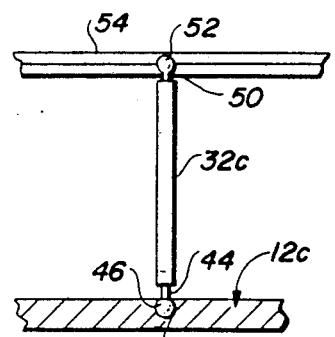
FIG. 7 is a schematic, fragmentary, enlarged side elevation, partly in section, of the slide bar and a vane of the cover of FIG. 6.
Figure 8:
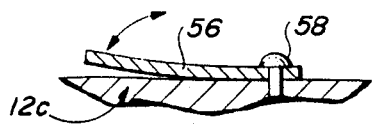
FIG. 8 is a schematic, fragmentary, enlarged side elevation, partly in section, of the clip retainer for the slide bar in the closed position, shown in FIG. 6; and, FIG. 9 is a schematic, fragmentary, enlarged side elevation, partly in section, of the clip retainer for the slide bar in the open position, which retainer is shown in FIG. 6.
Figure 9:
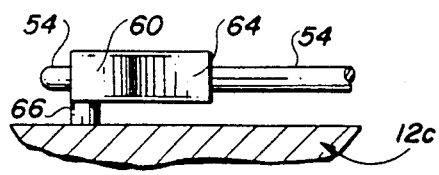

A fourth preferred embodiment of the improved license plate cover of the present invention is schematically depicted in FIGS. 6-9, inclusive. Thus, cover 10c is shown. Components similar to those of any of covers 10, 10a and/or 10b bear the same numerals but are succeeded by the letter "c". Cover 10c is substantially identical to cover 10 except as follows:

(a) Vanes 32c are transparent, but with inclusions 40c;

(b) as shown in FIG. 7, each vane 32c is pivotally secured to frame 12c, as by a pin 44 connected to a ball 46 disposed rotatably in a pocket 48 in frame 12c in a manner to prevent its removal therefrom, pin 44 being disposed in one end of vane 32c while a similar pin 50 is disposed in the opposite end of vane 32c and is connected by a cross-pin 52 to a push bar 54, cross-pin 52 being rotatably received in the side of bar 54;

(c) push bar 54 is parallel to top 14c and moveable in the directions of the arrows in FIG. 6 to move vanes 32c between the closed position shown in FIG. 6 where they overlie plate 26c and seal it and the open position shown in FIG. 7 where vanes 32c are perpendicular to the main plane of frame 12c;

(d) as shown in FIG. 8, a spring clip retainer 56 is pivotally secured, as by a pin 58, to side 20c of frame 12c to hold one end of bar 54 down when vanes 32c are closed (FIG. 6);

(e) as shown in FIG. 9, a second spring clip retainer 60 in the form of two converging spring plates 62 and 64 supported on a stand 66 above frame 12c at side 18c is adapted to receive and releasably retain the opposite end of bar 54 when vanes 32c are in the open position of FIG. 7, thus holding vanes 32c in place.

Cover 10c thus permits opening and closing of vanes 32c by bar 54 to block viewing thereof from the side (vane open position) and to seal the face of plate 26c (vane closed position). Cover 10c also has substantially the other advantages of cover 10.

Various other changes, alterations, additions and modifications can be made in the improved cover of the present invention, its components and their parameters. All such modifications, changes, alterations and additions as are within the scope of the appended claims form part of the present invention.

What is claimed is:

1. An improved vehicle license plate assembly, said assembly comprising, in combination:
   (a) a vehicle license plate bearing identification indicia on the front face thereof;
   (b) a generally flat frame comprising interconnected top, bottom and sides collectively defining a central opening, said frame overlying the outer perimeter of said vehicle license plate, with said opening exposing the identification indicia of said license plate to viewing; and,
   (c) a plurality of spaced vanes connected to said frame and spanning said opening, said vanes projecting outwardly at an angle to said frame so as to obscure viewing of said identification indicia from the sides of said plate.

2. The improved assembly of claim 1 wherein said vanes are generally parallel to each other and are disposed from said top to said bottom of said frame.

3. The improved assembly of claim 2 wherein said vanes are vertical and parallel, and project at a right angle to the main plane of said frame.

4. The improved assembly of claim 1 wherein said vanes are one of opaque and transparent.

5. The improved assembly of claim 4 wherein said vanes bear markings viewable from the sides of said frame.

6. The improved assembly of claim 1 wherein said vanes are pivotally secured to said frame for rotation between an open vane position for viewing said identification indicia only when directly in line therewith, and a closed vane position wherein said vanes are parallel to the main plane of said frame to protect said plate.

7. The improved assembly of claim 6 wherein said vanes are opaque so that said identification indicia are obscured when said vanes are in said closed position.

8. The improved assembly of claim 6 wherein said vanes are transparent but collectively obscure viewing of said identification indicia from the sides of said frame when said vanes are in said open position.

9. The improved assembly of claim 6 wherein said frame includes a bar connected to each of said vanes and adapted to move them between said open and closed positions, and wherein said frame includes means to secure said vanes in said open and closed positions.

10. The improved assembly of claim 1 wherein said vanes and frame are unitary and integral.

11. The improved assembly of claim 1 includes means to releasable secure said frame to said plate.

12. The improved assembly of claim 11 wherein said securing means comprises at least one spring-biased clip.

* * * * *